(12) United States Patent
Zhang et al.

(10) Patent No.: US 12,067,333 B2
(45) Date of Patent: Aug. 20, 2024

(54) METHODS FOR ESTIMATING REFRIGERANT CHARGE FOR HVACR SYSTEMS

(71) Applicant: TRANE INTERNATIONAL INC., Davidson, NC (US)

(72) Inventors: Jian Ming Zhang, Shanghai (CN); Lifen Li, Jiangsu (CN); James P. Crolius, La Crosse, WI (US); Scott A. Munns, Onalaska, WI (US)

(73) Assignee: TRANE INTERNATIONAL INC., Davidson, NC (US)

( * ) Notice: Subject to any disclaimer, the term of this patent is extended or adjusted under 35 U.S.C. 154(b) by 0 days.

(21) Appl. No.: 17/933,356

(22) Filed: Sep. 19, 2022

(65) Prior Publication Data
US 2023/0014287 A1 Jan. 19, 2023

Related U.S. Application Data

(63) Continuation of application No. 16/420,932, filed on May 23, 2019, now Pat. No. 11,449,650.

(30) Foreign Application Priority Data

May 23, 2018 (CN) .......................... 20181050107.3

(51) Int. Cl.
*G06F 17/18* (2006.01)
*F25B 49/02* (2006.01)
(Continued)

(52) U.S. Cl.
CPC ............ *G06F 30/20* (2020.01); *F25B 49/022* (2013.01); *F25B 2500/19* (2013.01);
(Continued)

(58) Field of Classification Search
CPC ......................... F25B 2700/13; F25B 2600/05
(Continued)

(56) References Cited

U.S. PATENT DOCUMENTS

8,087,258 B2 * 1/2012 Toyoshima ............. F25B 13/00
 62/149
9,803,902 B2 * 10/2017 Pham ...................... F25B 45/00
(Continued)

FOREIGN PATENT DOCUMENTS

CN 101603751 A 12/2009
CN 102378884 A 3/2012
(Continued)

OTHER PUBLICATIONS

"https:??web.archive.org/web/20171031003342/http://www.mathworks.com:80/help/cu . . . , Polynomial-Models-MATLAB-Quadratics, Oct. 31, 2017" (Year: 2017).*
(Continued)

*Primary Examiner* — Nelson J Nieves
*Assistant Examiner* — Meraj A Shaikh
(74) *Attorney, Agent, or Firm* — HSML P.C.

(57) ABSTRACT

A method for estimating refrigerant charge for an HVACR system is provided. The method includes obtaining one or more system parameters during operation. The one or more system parameters include at least one of compressor suction superheat, system mass flow, expansion device mass flow or opening degree, compressor suction saturated temperature, and compressor discharge saturated temperature. The method also includes conducting a regression analysis on the one or more system parameters to determine one or more predictive parameters for estimating the refrigerant charge. The method further includes determining a predictive model based on regression analysis. The predictive model establishes a relationship between the refrigerant
(Continued)

charge and the one or more predictive parameters. Also the method includes estimating the refrigerant charge based on the predictive model.

14 Claims, 9 Drawing Sheets

(51) Int. Cl.
    *G06F 30/20*         (2020.01)
    *G06F 111/10*       (2020.01)

(52) U.S. Cl.
    CPC ... *F25B 2700/04* (2013.01); *F25B 2700/1931* (2013.01); *F25B 2700/21161* (2013.01); *F25B 2700/21162* (2013.01); *F25B 2700/21163* (2013.01); *F25B 2700/21172* (2013.01); *F25B 2700/21173* (2013.01); *G06F 2111/10* (2020.01)

(58) Field of Classification Search
    USPC .................................. 62/209, 149, 129, 132
    See application file for complete search history.

(56) References Cited

U.S. PATENT DOCUMENTS

| | | | |
|---|---|---|---|
| 2006/0021362 A1* | 2/2006 | Sadegh | F25B 49/005 62/149 |
| 2006/0144059 A1 | 7/2006 | Kang et al. | |
| 2011/0112814 A1* | 5/2011 | Clark | G01M 3/3227 73/40 |
| 2016/0377333 A1* | 12/2016 | Bertagnolio | F25B 31/00 62/56 |
| 2018/0187915 A1* | 7/2018 | Nelson | F24F 11/79 |
| 2018/0299155 A1* | 10/2018 | Walsh | F24F 11/58 |

FOREIGN PATENT DOCUMENTS

| | | | | |
|---|---|---|---|---|
| CN | 102667352 A | | 9/2012 | |
| CN | 103958985 A | | 7/2014 | |
| CN | 106765973 A | | 5/2017 | |
| CN | 106777711 A | | 5/2017 | |
| KR | 2003062649 A | * | 7/2003 | |
| KR | 2003062649 A | | 7/2003 | |
| KR | 1902472 B1 | * | 11/2018 | ......... F16K 37/0041 |
| KR | 1902472 B1 | | 11/2018 | |

OTHER PUBLICATIONS

Zhu Zhijiang et al., "The characteristics of air condition refrigerant under-charge and its theoretical analysis", Household Appliance Technology, Mar. 12, 2014, with English abstract (2 pages).
Office Action, Chinese Patent Application No. 201810501507.3, Oct. 27, 2021, with English translation (17 pages).
Office Action, Chinese Patent Application No. 201810501507.3, Apr. 12, 2022, with English translation (22 pages).
De Claus Barklux et al., "Multivariate Statistical Analysis Methods with SPSS Tools, 2nd Edition", Green Press, Shanghai Publishers, pp. 62-69, Jul. 31, 2017 (cited in body of 2nd Chinese Office Action, see page 5 of translation).

\* cited by examiner

METHODS FOR ESTIMATING REFRIGERANT CHARGE FOR HVACR SYSTEMS

FIELD

This disclosure relates generally to heating, ventilation, air conditioning, and refrigeration (HVACR) systems. More specifically, the disclosure relates to methods and systems for estimating refrigerant charge for HVACR systems.

BACKGROUND

A heat transfer circuit for an HVACR system generally includes a compressor, a condenser, an expansion device, and an evaporator fluidly connected. In some applications, superheat or sub-cooling is used in predicting system refrigerant charge indirectly. When the HVACR system is running, even if the system refrigerant charge is near 100%, sometimes "Loss of Charge" false alarms could occur. Accuracy of predicting the system refrigerant charge needs to be improved.

SUMMARY

This disclosure relates generally to HVACR systems. More specifically, the disclosure relates to methods and systems for estimating refrigerant charge for HVACR systems.

In one embodiment, a method for estimating an amount of refrigerant charge for an HVACR system is provided. The HVACR system includes a compressor and an expansion device. The method includes operating the HVACR system. The method also includes obtaining one or more system parameters of the HVACR system during operation. The one or more system parameters include suction superheat of the compressor, mass flow of the HVACR system, mass flow or a degree of opening of the expansion device, suction saturated temperature of the compressor, and discharge saturated temperature of the compressor. The method further includes conducting a regression analysis on the one or more system parameters to determine predictive parameters for estimating the amount of refrigerant charge. Also the method includes based on the regression analysis, determining a predictive model for estimating the amount of refrigerant charge. The predictive model establishes a relationship between the amount of refrigerant charge and the predictive parameters. The method also includes estimating the amount of refrigerant charge for the HVACR system based on the predictive model.

Embodiments disclosed herein use a regression analysis to determine predictive parameters for estimating the amount of refrigerant charge, thereby determining a predictive model for estimating the amount of refrigerant charge, to predict the amount of refrigerant charge directly. As such, prediction accuracy can be improved, potential failures due to the lack of refrigerant can be reduced, user experience can be improved, and maintenance costs can be saved.

It will be appreciated that the foregoing general description and the following detailed description are exemplary and explanatory only, and are not limiting in any aspects.

Other features and aspects will become apparent by consideration of the following detailed description and accompanying drawings.

BRIEF DESCRIPTION OF THE DRAWINGS

References are made to the accompanying drawings that form a part of this disclosure and which illustrate the embodiments in which systems and methods described in this specification can be practiced.

Like reference numbers represent like parts throughout.

DETAILED DESCRIPTION

This disclosure relates generally to HVACR systems. More specifically, the disclosure relates to methods and systems for estimating refrigerant charge for HVACR systems.

In particular, the embodiments described herein use a regression analysis to determine predictive parameters for estimating the amount of refrigerant charge, thereby determining a predictive model for estimating the amount of refrigerant charge, to predict the amount of refrigerant charge directly. As such, prediction accuracy can be improved, potential failures due to the lack of refrigerant can be reduced, user experience can be improved, and maintenance costs can be saved.

Illustrative embodiments will be described in detail herein, examples of which are illustrated in the accompanying drawings. The following description refers to the accompanying drawings, wherein like numerals in different drawings represent the same or similar elements unless otherwise indicated. The embodiments described in the following exemplary embodiments do not represent all embodiments consistent with the disclosure. Rather, they are examples of systems and methods consistent with some aspects of the disclosure.

The terminology used herein is for the purpose of describing particular embodiments only and is not intended to be limiting. The singular forms "a", "one", "the" used in the disclosure are intended to include the plural forms unless the context clearly dictates otherwise. It will also be appreciated that the terms "and/or" as used herein are intended to refer to and include any or all possible combinations of the plurality of associated listed items.

It will be appreciated that, although the disclosure may use the terms "first", "second", "third", and the like to describe various information, the information should not be limited by these terms. These terms are only used to distinguish the same type of information from one another. For example, without departing from the scope of the disclosure, the "first" information may also be referred to as the "second" information, and, similarly, the "second" information may also be referred to as the "first" information. Depending on the context, the term "if" as used herein can be interpreted as "when" or the like.

The methods and systems for estimating the amount of refrigerant charge for an HVACR system is described in detail with reference to the accompanying drawings. In the case of no conflict, the embodiments described herein and the features in the embodiments can be combined with each other.

Figure 1:
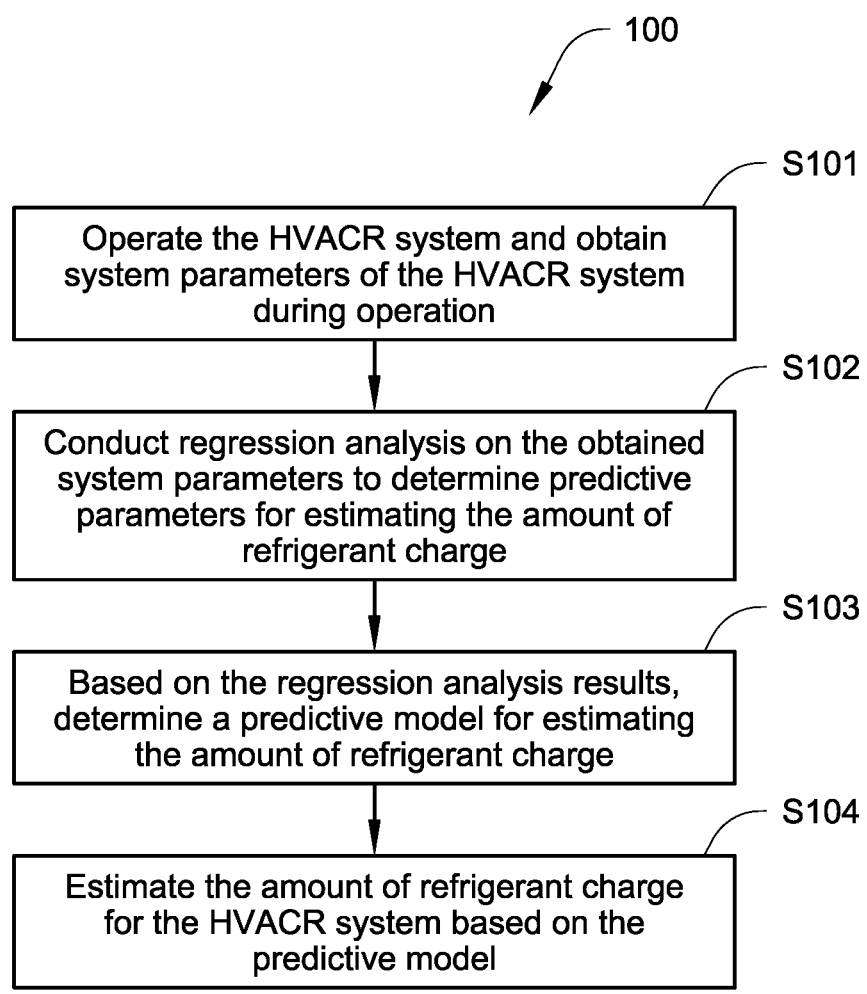
FIG. 1 is a flow chart illustrating a method for estimating an amount of refrigerant charge for an HVACR system, according to one embodiment.
Figure 2:
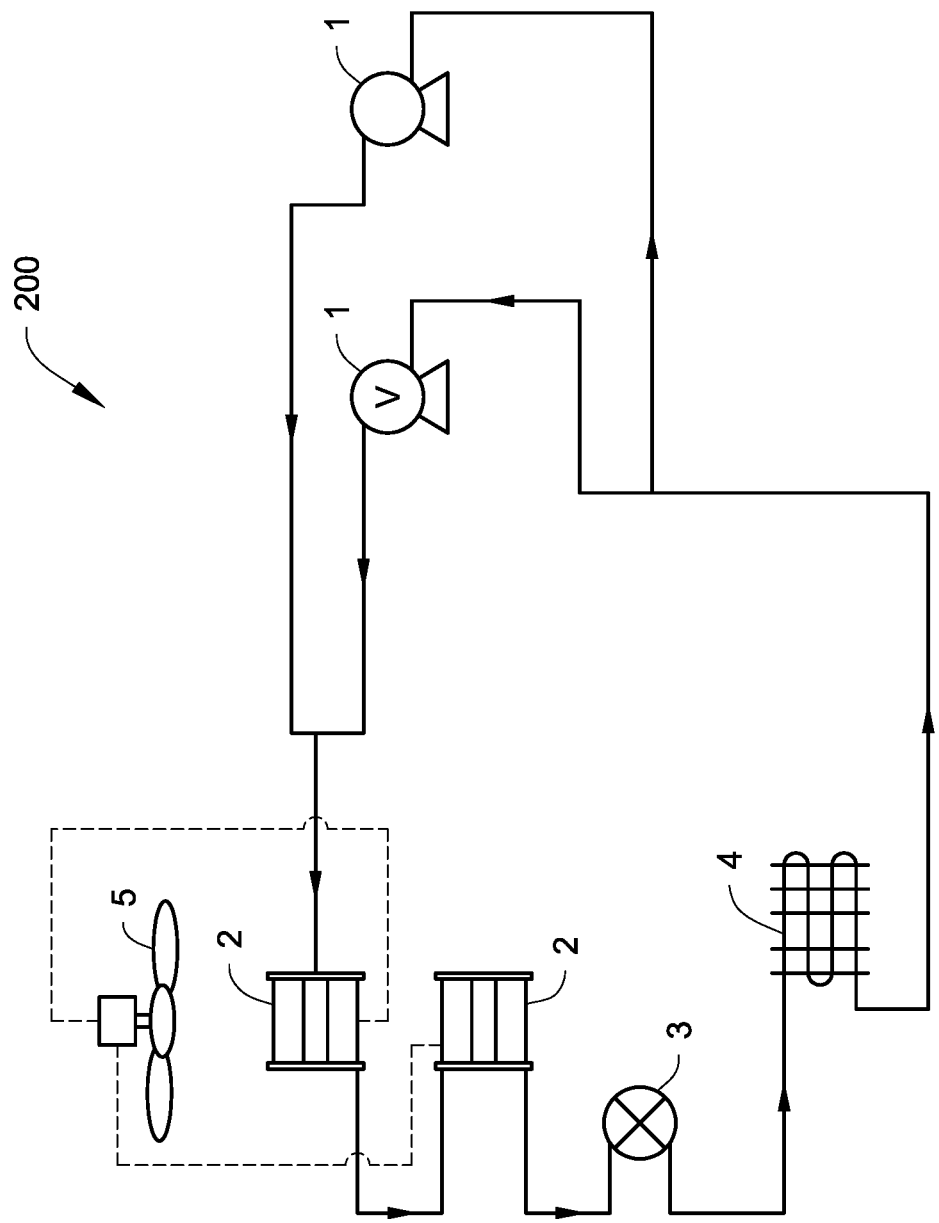
FIG. 2 is a schematic structural diagram illustrating an HVACR system, according to one embodiment.
Figure 3:
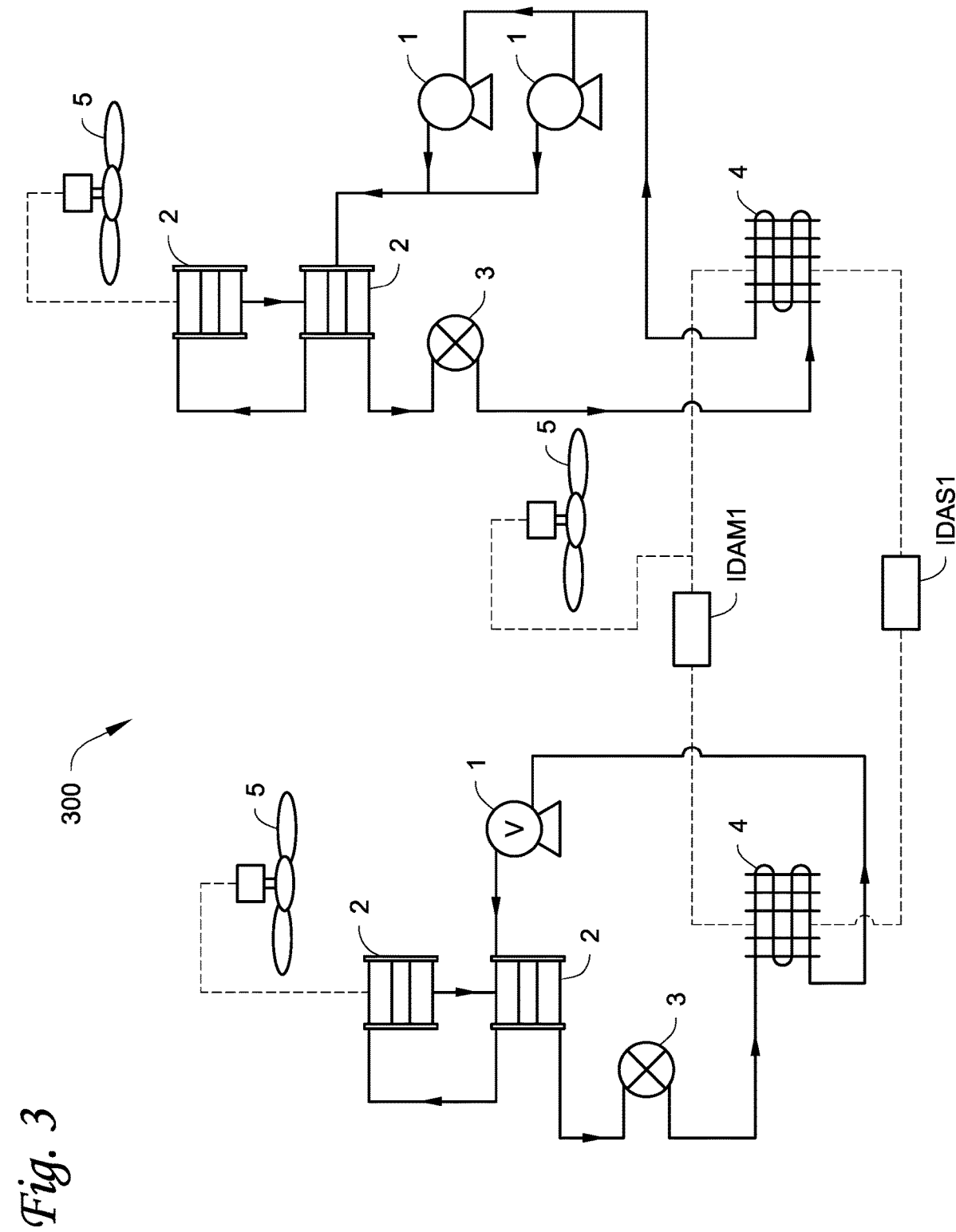
FIG. 3 is a schematic structural diagram illustrating another HVACR system, according to one embodiment.
Figure 4:
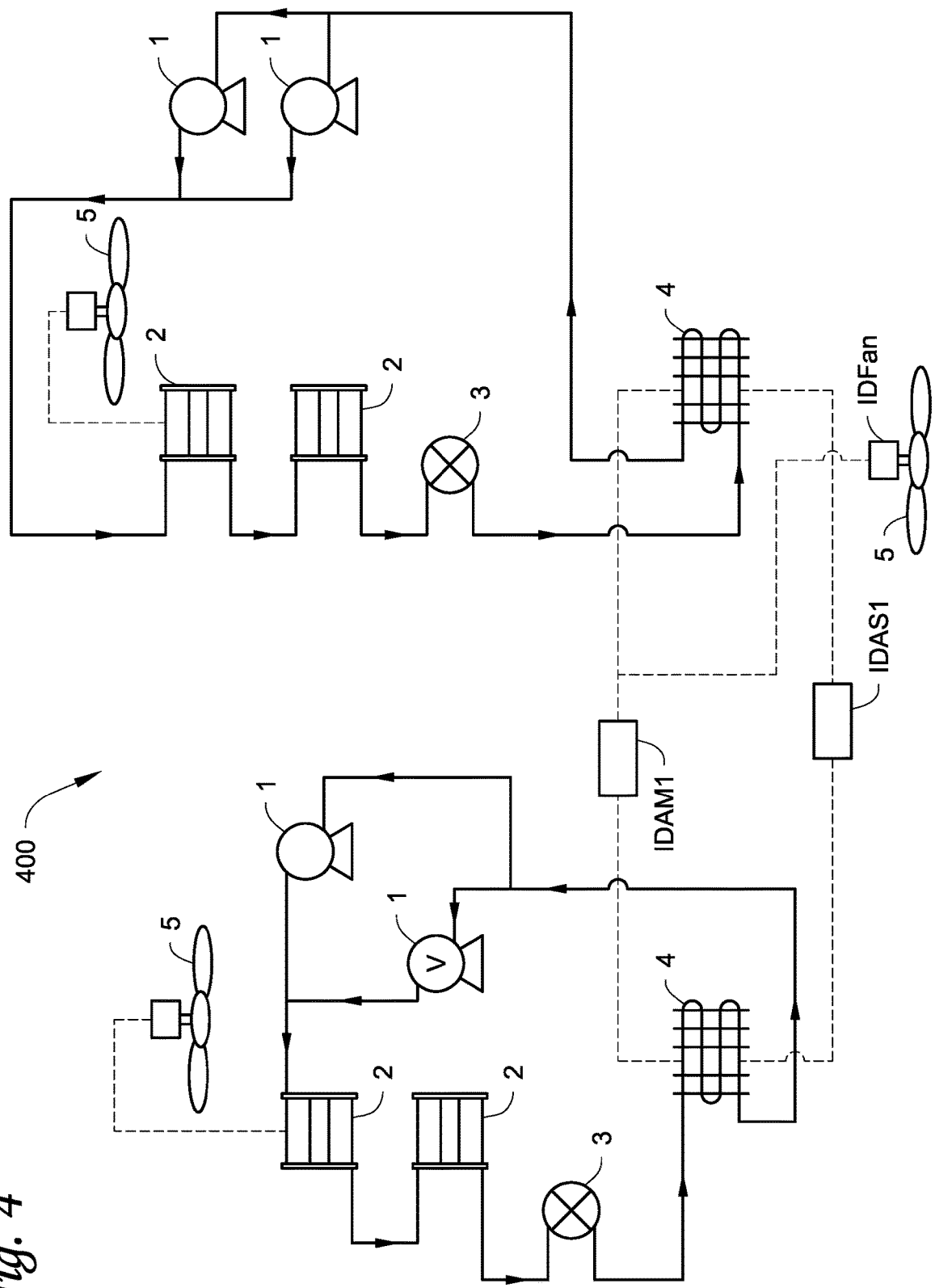
FIG. 4 is a schematic structural diagram illustrating yet another HVACR system, according to one embodiment.

FIG. 1 is a flow chart illustrating a method 100 for estimating an amount of refrigerant charge for an HVACR system, according to one embodiment. The HVACR system can be, for example, the HVACR system (200, 300, and/or 400) as shown in FIGS. 2-4. It will be appreciated that unless specified otherwise, all the steps in FIG. 1 can be performed by, e.g., a controller, and each of the one or more system parameters identified can be determined via, e.g., one or more sensors.

FIG. 2 is a schematic structural diagram illustrating an HVACR system 200, according to one embodiment. FIG. 3 is a schematic structural diagram illustrating another HVACR system 300, according to one embodiment. FIG. 4 is a schematic structural diagram illustrating yet another HVACR system 400, according to one embodiment.

As shown in FIGS. 2-4, the HVACR system (200, 300, and/or 400) includes compressor(s) 1, condenser(s) 2, expansion device(s) 3, evaporator(s) 4, and fan(s) 5. The fan(s) 5 can include condenser fan(s). The condenser fan(s) can include fixed-speed and/or variable speed fan(s). Connections among the components of the HVACR system (200, 300, and/or 400) are shown in FIGS. 2-4 (solid lines indicating, for example, refrigerant flow or processing fluid flow; dotted lines indicating, for example, air flow or working fluid flow). In FIGS. 3 and 4, the IDFan can be, e.g., an indoor fan for the air flow or working fluid flow. The IDAM1 and IDAS1 can be e.g., building, devices, etc. that exchange heat with the air flow or working fluid flow.

The compressor 1 can include a variable frequency compressor (the compressor with a label "v" as shown in FIGS. 2-4). The compressor 1 can also include a fixed frequency compressor (the compressor without the label "v" as shown in FIGS. 2-4).

The expansion device 3 can be but is not limited to for example an expansion valve, orifice, expander, or the like. It will be appreciated that the expansion valve can be an electric expansion valve. The condenser 2 can be, for example, an evaporative condenser having air-cooling characteristics.

The HVACR system (200, 300, and/or 400) can also include a programmable controller (not shown) and one or more sensors (not shown, e.g., temperature sensor(s), pressure sensor(s), velocity sensor(s), volume sensor(s), etc.) that are configured to measure one or more system parameters of the HVACR system (200, 300, and/or 400) and communicate the system parameter data to the controller. The controller can include a single integrated control unit or a distributed network of controller elements. The controller can have processor(s) and memory for storage. The controller connects to the one or more sensors and connects to each of the components (e.g., compressor(s) 1, condenser(s) 2, expansion device(s) 3, evaporator(s) 4, and/or fan(s) 5) of the HVACR system (200, 300, and/or 400). The controller is configured to obtain the sensed parameters from the one or more sensors and to control one or more of the components of the HVACR system (200, 300, and/or 400).

Referring back to FIG. 1, the method 100 begins at S101. At S101, the method includes operating the HVACR system (by e.g., a controller) and obtaining one or more system parameters (e.g., via one or more sensors) of the HVACR system during operation. The HVACR system can be the HVACR system 200, 300, and/or 400 as shown in FIGS. 2-4. The one or more system parameters include suction superheat of the compressor, suction saturated temperature of the compressor, mass flow of the HVACR system, mass flow or a degree of opening of the expansion device, and discharge saturated temperature of the compressor. In some embodiments, the one or more system parameters can include high and low pressure ratio of the compressor. In some embodiments, suction density of the compressor can be determined based on e.g., suction saturated temperature of the compressor and suction superheat of the compressor. In some embodiments, volume flow of the HVACR system can be determined and used to determine the mass flow of the HVACR system.

It will be appreciated that superheat can be measured (e.g., via sensor(s) such as temperature sensor(s)) as the difference between the actual temperature of the refrigerant vapor and the saturation temperature of the refrigerant at that same point/pressure. The measured temperature(s), e.g., via the sensor(s), can be sent to the controller. Suction superheat of the compressor can be the superheat at the suction side of the compressor. In one embodiment, the suction superheat can be the difference of the temperature leaving evaporator and the suction saturated temperature entering the compressor. In such embodiment, the suction pressure measurement can be obtained near the suction port(s) of the compressor(s), and the associated temperature measurement for determining the "suction superheat" can be obtained at the evaporator side of the same refrigerant line. It will be appreciated that superheat can be defined as the difference of the measured temperature and saturated temperature determined from a measured pressure. In one embodiment, both the measured temperature and the measured pressure can be measured at the same point, which can be at the compressor side, or at the evaporator side of the same refrigerant line. In one embodiment, the measured pressure can be measured at the compressor side of the same refrigerant line, and the measured temperature can be measured at the evaporator side of the same refrigerant line. In one embodiment, the measured pressure can be measured at the evaporator side of the same refrigerant line, and the measured temperature can be measured at the compressor side of the same refrigerant line.

It will also be appreciated that mass flow of the HVACR system can refer to the mass flow of the refrigerant through the HVACR system. In the embodiments disclosed herein, the HVACR system's mass flow (or normalized mass flow) refers to an estimated total compressor mass flow (or normalized mass flow) based on, e.g., the following compressor status/parameters:
  a. suction pressure or suction saturated temperature,
  b. discharge pressure or discharge saturated temperature, or a proxy (for the discharge pressure or discharge saturated temperature) value based on outdoor air temperature,
  c. suction superheat (that can be calculated from suction temperature−suction saturated temperature),
  d. which compressor(s) are installed in each position on the refrigeration circuit, and which compressor(s) are on or off, e. the speed of any variable-speed compressor(s), and/or f. suction density for some embodiments. In such embodiments, a correlation can solve for compressor suction volume flow (CFM) instead of mass flow, and the suction density is used to convert the volume flow to mass flow.

It will further be appreciated that mass flow of the expansion device can refer to an estimated mass flow of the refrigerant through the expansion device. The mass flow of the expansion device can be, for example, a normalized mass flow. It will be appreciated that the normalized mass flow of the expansion device (e.g., expansion valve) can be used to compare an expected valve capacity at a given position against a compressor capacity at a given suction and/or discharge pressures. If the expansion device is open more than expected, that can be an indication of refrigerant charge loss. The normalized mass flow of the expansion device can compensate for differences in differential pressure (high differential pressure across the expansion device can give more flow through the expansion device). The normalized mass flow of the expansion device can also compensate for potential nonlinearity of the expansion device (flow may not always be proportional to the expansion device opening), and for the size of the expansion device relative to the size of the compressor(s) on in the HVACR system. Also, the normalized mass flow of the expansion device can exceed 1.0 under some operating conditions. It will be appreciated that the degree (e.g., in percentage) of the opening of the expansion device cannot exceed 100%.

In the embodiments disclosed herein, there can be a condition/assumption for estimating the mass flow (or normalized mass flow) of the expansion device—a solid liquid "head" at the entrance of the expansion device (e.g., no two-phase flow with a mixture of liquid or liquid droplets and vapor at the inlet). Without such condition/assumption, the mass flow (or normalized mass flow) of the expansion device can be equal to the HVACR system's mass flow (or normalized mass flow).

Also it will be appreciated that in one embodiment, the HVACR system can have multiple evaporator coils. In such embodiment, the refrigerant flow can be split for each refrigerant circuit to the multiple evaporator coils, and each of the evaporator coils can have a separate expansion device. A weighted summation of the normalized mass flow of each expansion device can be performed to get a total normalized mass flow of the expansion device.

In one embodiment, a normalized mass flow for the compressor can be determined with a function of a suction pressure or suction saturated temperature measurement, and a discharge pressure or discharge saturated temperature measurement. In another embodiment, the normalized mass flow for the compressor can be determined with a function of a suction pressure or suction saturated temperature measurement and an outdoor air/ambient temperature measurement.

It will also be appreciated that high and low pressure ratio of the compressor can refer to the ratio of the pressure as measured at the discharge side (high pressure) and at the suction side (low pressure) of the compressor.

It will further be appreciated that density can refer to weight or mass of a fluid (e.g., refrigerant). Suction density of the compressor can refer to the density at the suction side of the compressor.

Also it will be appreciated that volume flow of the HVACR system can refer to the volume of the fluid (e.g., refrigerant) which passes through the HVACR system.

It will also be appreciated that saturated temperature can refer to boiling point of the refrigerant, and/or temperature for a corresponding saturation pressure at which a liquid refrigerant boils into vapor phase. The discharge saturated temperature of the compressor can be the saturated temperature at the discharge side of the compressor.

Referring back to FIG. 1, before the step S101, the method 100 can include operating (e.g., via controller(s)) a plurality of HVACR systems under a plurality of operation conditions. Each of the plurality of HVACR systems can have capacity different from each other. The plurality of HVACR systems operates with a predetermined amount of refrigerant charge and at a predetermined compressor speed. The plurality of operation conditions can define the load of the evaporator and the load of the condenser. The predetermined amount of refrigerant charge can be represented as a percentage (the predetermined amount of refrigerant charge divided by a full amount of refrigerant charge). The predetermined amount of refrigerant charge can be at or about 100%, at or about 75%, and/or at or about 50%, or other percentages. The predetermined compressor speed can include at least one compressor speed (including two speeds, multiple speeds, etc.).

At S101, the method can include operating each of the plurality of HVACR systems (having capacity different from each other) by e.g., controller(s), and obtaining one or more system parameters (e.g., via one or more sensors) of each of the plurality of HVACR systems during operation. The HVACR systems can include the HVACR systems 200, 300, and/or 400 as shown in FIGS. 2-4. The one or more system parameters can include suction superheat of the compressor, suction saturated temperature of the compressor, mass flow of the HVACR system, mass flow or a degree of opening of the expansion device, and discharge saturated temperature of the compressor.

In one embodiment, the plurality of operation conditions includes at least one of the following conditions:

(a) Evaporator return air dry-bulb/wet-bulb temperature at or about 67° F./at or about 57° F., air volume at or about 200 CFM/ton, and outdoor ambient temperature at or about 95° F., where CFM is cubic feet per minute. Under this operation condition, the evaporating load is low and the condensing load is high.

(b) Evaporator return air dry-bulb/wet-bulb temperature at or about 90° F./at or about 73° F., air volume at or about 350 CFM/ton, and outdoor ambient temperature at or about 50° F. Under this operation condition, the evaporating load is high and the condensing load is low.

(c) Evaporator return air dry-bulb/wet-bulb temperature at or about 67° F./at or about 57° F., air volume at or about 200 CFM/ton, and outdoor ambient temperature at or about 50° F. Under this operation condition, the evaporating load is low and the condensing load is low.

(d) Evaporator return air dry-bulb/wet-bulb temperature at or about 90° F./at or about 73° F., air volume at or about 350 CFM/ton, and outdoor ambient temperature at or about 95° F. Under this operation condition, the evaporating load is high and the condensing load is high.

(e) Evaporator return air dry-bulb/wet-bulb temperature at or about 70° F./at or about 63° F., air volume at or about 200 CFM/ton, and outdoor ambient temperature at or about 70° F. Under this operation condition, the evaporating load is a median and the condensing load is a median.

It will be appreciated that under the condition evaporator return air dry-bulb/wet-bulb temperature at or about 67° F./at or about 57° F., the low evaporating load can be from at or about 30° F. to at or about 45° F. (suction saturated temperature). It will also be appreciated that under the condition evaporator return air dry-bulb/wet-bulb temperature at or about 90° F./at or about 73° F., the high evaporating load can be from at or about 50° F. to at or about 65° F. (suction saturated temperature). It will further be appreciated that under the condition outdoor ambient temperature at or about 50° F., the low condenser load can be from at or about 80° F. to at or about 100° F. (discharge saturated temperature). Also it will be appreciated that under the condition outdoor ambient temperature at or about 95° F., the high condenser load can be from at or about 105° F. to at or about 130° F. (discharge saturated temperature).

It will be appreciated that a dry-bulb temperature can be the temperature of air measured, e.g., by a thermometer freely exposed to the air, but shielded from radiation and moisture. The dry-bulb temperature can be the air temperature and the thermodynamic temperature. The dry-bulb temperature can indicate the amount of heat in the air and can be directly proportional to the mean kinetic energy of the air molecules.

It will also be appreciated that a wet-bulb temperature can be the temperature measured, e.g., by a thermometer covered in water-soaked cloth (wet-bulb thermometer) over which air is passed. It will also be appreciated that at or about 100% relative humidity, the wet-bulb temperature can be equal to the air temperature (dry-bulb temperature) and can be lower at lower humidity. The wet-bulb temperature can be defined as the temperature of a parcel of air cooled to saturation (at or about 100% relative humidity) by the evaporation of water into it, with the latent heat supplied by the parcel.

It will further be appreciated that the plurality of operation conditions can include other operation conditions.

At S101, before the step of operating each of the plurality of HVACR systems (having capacity different from each other) by e.g., controller(s), under the plurality of operation conditions, each of the plurality of HVACR systems ran be configured to prevent a testing process from being interfered. The testing process is configured to determine, e.g., by a controller, a relationship between the amount of refrigerant charge and the one or more system parameters (including e.g., suction superheat of the compressor, suction saturated temperature of the compressor, mass flow of the HVACR system, mass flow or a degree of opening of the expansion device, and discharge saturated temperature of the compressor).

Before the step of operating the plurality of HVACR systems having different capacities under the plurality of operation conditions, the method further includes at least one of the following steps:

(1) Controlling, e.g., by a controller, a first temperature for starting a frost-protection mechanism for each of the plurality of HVACR systems having different capacities to be less than a first predetermined temperature. The start of the frost-protection mechanism can cause unloading or shutdown of the HVACR system. As such, before the testing process, the controller is configured to lower the temperature for starting the frost-protection mechanism to a first predetermined temperature to prevent the HVACR system from unloading or shutdown and prevent the testing process from being affected. It will be appreciated that in one embodiment, a first temperature for starting a frost-protection can be at or above 30° F. (suction saturated temperature). A first determined temperature can be e.g., at or about 28° F. during testing to allow the HVACR system to run without tripping on frost-protection. Controlling a first temperature to be less than the first predetermined temperature can allow the HVACR system to run so operation data can be recorded for the regression analysis. It will also be appreciated that in one embodiment, there can be a Nominal Coil Frost Threshold that can be at or about 28° F., and can be set from at or about 25° F. to at or about 35° F. It will be appreciate that there can be a Coil Frost Delta setting, with default value of at or about 8° F., which can be set from at or about 3° F. to at or about 20° F. When running the testing process, both the Nominal Coil Frost Threshold and the Coil Frost Delta can be set at the minimum value, as such, the refrigeration circuit cannot be allowed to load below 28° F. SST (Suction Saturated Temperature), and can actively unload below 25° F. SST.

(2) Controlling, e.g., by a controller, a second temperature for starting a protection mechanism for suction saturated temperature of the compressor for each of the plurality of HVACR systems having different capacities to be greater than a second predetermined temperature. The control of the second temperature can further prevent the testing process from being affected due to the fact that the temperature for starting a protection mechanism for suction saturated temperature of the compressor is too low. The second temperature can be a High Suction Saturated Temperature Inhibit setpoint, which can have a nominal value of at or about 80° F., with a range of from at or about 59° F. to at or about 80° F.

(3) Turning off, e.g., by a controller, a warning mechanism indicating a lack of refrigerant for each of the plurality of HVACR systems having different capacities. Turning off the warning mechanism can prevent the start of the warning mechanism to interrupt/stop the testing process.

(4) Setting, e.g., by a controller, a condenser fan speed to an automatic control mode; and (5) Setting, e.g., by a controller, a supply air temperature to 40° F.

Referring to FIGS. 2-4, the HVACR systems 200, 300, and 400 have capacity of 30 ton, 55 ton, and 75 ton, respectively. Each of the HVACR systems 200, 300, and 400 includes variable-frequency compressor(s) (labeled with letter "v") and fixed-frequency compressor(s) (without the label "v").

Referring back to FIG. 1, in one embodiment, in each of the HVACR systems 200, 300, and 400, the variable-frequency compressor(s) is/are turned on, by e.g., a controller; and the fixed-frequency compressor(s) is/are turned off. The rotational speed of the variable-frequency compressors can be 1500 rpm (revolutions per minute), 3000 rpm, and 6000 rpm. In such embodiment, the testing process includes:

(1) Configuring, e.g., by a controller, each of the HVACR systems (e.g., 200, 300, and 400);

(2) Controlling the amount of refrigerant charge (represented as a percentage) for each of the HVACR systems to be at or about 100%. In one embodiment, a user (e.g., a technician) can manually adjust the refrigerant charge. The user can add/remove charge using external equipment and a weight measuring scale to achieve nominal values of at or about 50%, at or about 75%, and at or about 100% refrigerant charge.

(3) Controlling, e.g., by the controller, each of the HVACR systems to operate under operation condition (a).

(4) Controlling, e.g., by a controller, the variable-frequency compressor(s) of each of the HVACR systems to run e.g., 15 minutes at e.g., 1500 rpm. Then controlling, e.g., by the controller, the variable-frequency compressor(s) of each of the HVACR systems to run e.g., 15 minutes at e.g., 3000 rpm. And then controlling, e.g., by the controller, the variable-frequency compressor(s) of each of the HVACR systems to run e.g., 15 minutes at e.g., 6000 rpm. It will be appreciated that the 15 minutes are empirical values that can be set as desired.

(5) Controlling, e.g., by the controller, each of the HVACR systems to operate under operation conditions (b)-(e), and repeating (4) for each operation conditions.

(6) Controlling the amount of refrigerant charge (represented as a percentage) for each of the HVACR systems to be at or about 75%, and repeating (3)-(5); controlling the amount of refrigerant charge (represented as a percentage) for each of the HVACR systems to be at or about 50%, and repeating (3)-(5).

In another embodiment, in each of the HVACR systems 200, 300, and 400, the variable-frequency compressor(s) is/are turned on, by e.g., a controller; and the fixed-frequency compressor(s) is/are turned on as well. The rotational speed of the variable-frequency compressors can be 1500 rpm (revolutions per minute), 3000 rpm, and 5010 rpm. In such embodiment, the testing process includes:

(1) Configuring, e.g., by a controller, each of the HVACR systems (e.g., 200, 300, and 400);

(2) Controlling the amount of refrigerant charge (represented as a percentage) for each of the HVACR systems to be at or about 100%. In one embodiment, a user (e.g., a technician) can manually adjust the refrigerant charge. The user can add/remove charge using external equipment and a weight measuring scale to achieve nominal values of at or about 50%, at or about 75%, and at or about 100% refrigerant charge.

(3) Controlling, e.g., by the controller, each of the HVACR systems to operate under operation condition (a).

(4) Controlling, e.g., by a controller, the variable-frequency compressor(s) of each of the HVACR systems to run e.g., 15 minutes at e.g., 1500 rpm. Then controlling, e.g., by the controller, the variable-frequency compressor(s) of each of the HVACR systems to run e.g., 15 minutes at e.g., 3000 rpm. And then controlling, e.g., by the controller, the variable-frequency compressor(s) of each of the HVACR systems to run e.g., 15 minutes at e.g., 5010 rpm. It will be appreciated that the 15 minutes are empirical values that can be set as desired.

(5) Controlling, e.g., by the controller, each of the HVACR systems to operate under operation conditions (b)-(e), and repeating (4) for each operation conditions.

(6) Controlling the amount of refrigerant charge (represented as a percentage) for each of the HVACR systems to be at or about 75%, and repeating (3)-(5); controlling the amount of refrigerant charge (represented as a percentage) for each of the HVACR systems to be at or about 50%, and repeating (3)-(5).

After performing the testing process in the above embodiments, values for one or more system parameters for the plurality of HVACR systems having different capacities operated under a plurality of operation conditions can be obtained by e.g., the controller, via e.g., the one or more sensors. The one or more system parameters can include suction superheat of the compressor, suction saturated temperature of the compressor, mass flow of the HVACR system, mass flow or a degree of opening of the expansion device, and discharge saturated temperature of the compressor.

It will be appreciated that the models of the variable-frequency compressor(s) and/or the models of the fixed-frequency compressor(s) can be selected as desired.

Then the method proceeds to S102. At S102, a regression analysis is conducted by e.g., a processor running e.g., a statistical software, on the obtained one or more system parameters to determine predictive parameters for estimating the amount of refrigerant charge. The processor can be in a device (e.g., a computer, a mobile device, etc.) and/or in the cloud that connects to the controller. The controller is configured to send the obtained one or more system parameters to the processor to conducting the regression analysis. In one embodiment, the processor is in the controller.

It will be appreciated that in statistical modeling, regression analysis is a set of statistical processes for estimating the relationships among variables. Regression analysis is used for modeling and analyzing several variables, where the focus is on a relationship between a dependent variable ("criterion variable") and one or more independent variables ("predictors"). More specifically, regression analysis can help model how a typical value of the dependent variable changes when any one of the independent variables is varied, while the other independent variables are held fixed. It will also be appreciated that in linear regression, the model specification is that the dependent variable (e.g., the amount of refrigerant charge represented as a percentage) is a linear combination of the independent variables (e.g., the one or more system parameters identified above in the HVACR system).

Figure 5:
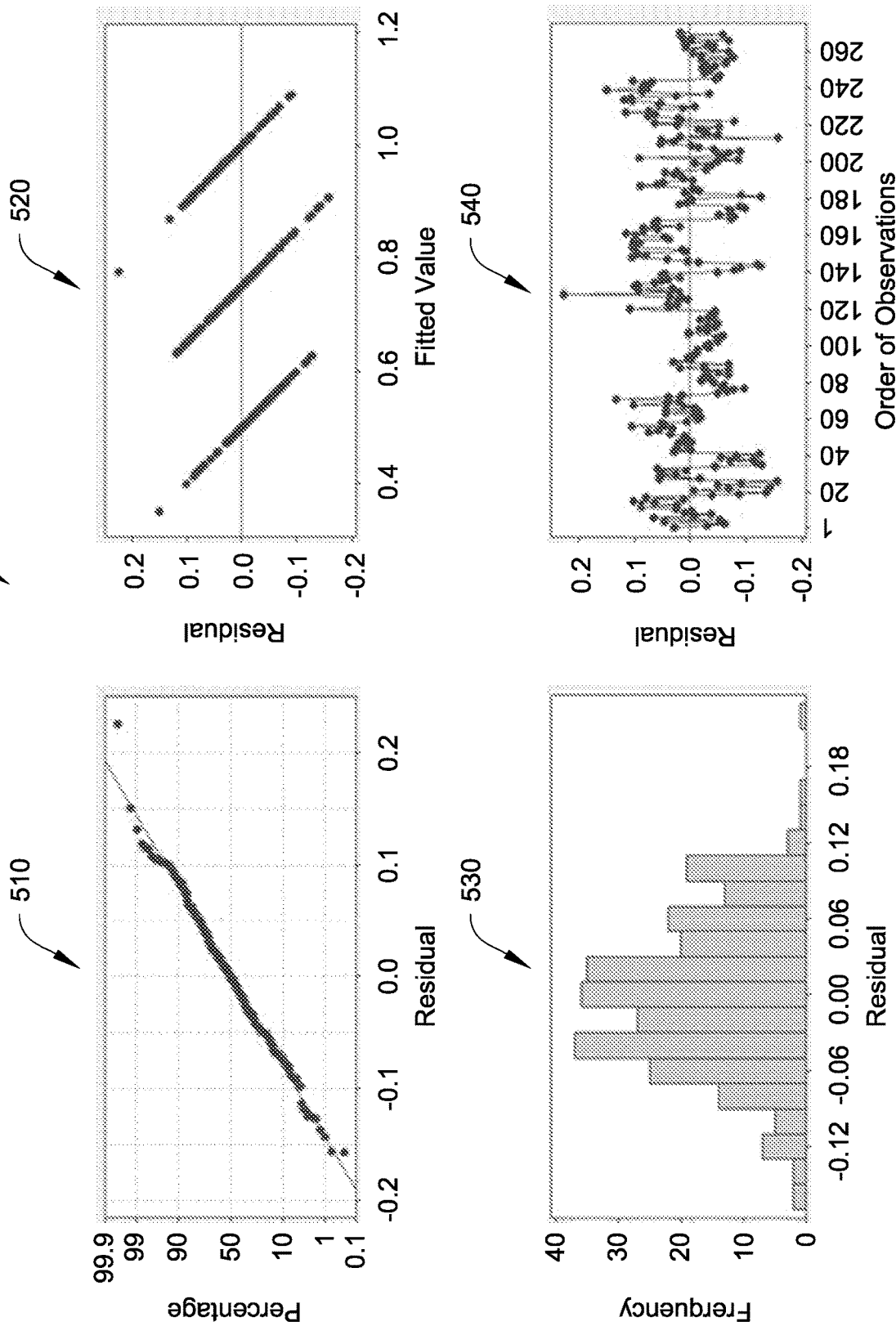
FIG. 5 shows residual plots from the regression analysis, according to one embodiment.

Referring to FIG. 5, FIG. 5 shows residual plots 500 from the regression analysis between the resultant amount of refrigerant charge and the one or more system parameters identified above, according to one embodiment. It will be appreciated that "residual" can be the difference between the value of the dependent variable predicted by the model and the true value of the dependent variable.

As shown in FIG. 5, 510 is a normal probability plot to identify substantive departures (of residual from model fits) from normality, 520 shows a relationship between the residual and the fitted value, 530 is a histogram of the residual, and 540 shows a relationship between the residual and the order of observations.

It will be appreciated that coefficient of determination, referring as "R2" and pronounced "R-squared", can be the proportion of the variance in the dependent variable that is predictable from the independent variable(s). $R^2$ can be a statistical measure of how close the data are to the fitted regression line. $R^2$ can reflect the proportion that all variation of the dependent variable can be explained by the independent variable(s) through the regression relation. Testing results show that in one embodiment, $R^2$ is 90.5%, which meets the residual requirements (where $R^2$ can be greater than 90%).

Referring back to FIG. 1, at S102, the step of conducting the regression analysis on the one or more system parameters to determine predictive parameters for estimating the amount of refrigerant charge includes conducting the regression analysis on the one or more system parameters to determine three system parameters as the predictive parameters. The three system parameters have the largest correlation with the amount of refrigerant charge among the one or more system parameters. In one embodiment, testing results show that such three predictive parameters including the suction superheat of the compressor, the mass flow of the HVACR system, and the mass flow or the degree of opening of the expansion device.

In order to compensate for differences between the different HVACR systems, in the regression analysis, the suction superheat of the compressor, the mass flow of the HVACR system, and the mass flow or the degree of opening of the expansion device can be relative values. For example, the relative suction superheat of the compressor can be the suction superheat of the compressor/the rated suction superheat of the compressor. The relative mass flow of the HVACR system can be the mass flow of the HVACR system/the rated mass flow of the HVACR system when the compressor is under a predetermined operation condition. The relative degree of opening of the expansion device can be the degree of opening of the expansion device/the degree of opening of the expansion device at a predetermined rated point. The relative mass flow (e.g., normalized mass flow) of the expansion device can be the mass flow of the expansion device/the rated mass flow of the expansion device.

Then the method proceeds to S103. At S103, the method includes based on the regression analysis, determining a predictive model for estimating the amount of refrigerant charge. The predictive model can establish a relationship between the amount of refrigerant charge and the predictive parameters.

To meet the requirement of R2 being greater than 90%, in addition to the three system parameters (see S102) having the largest correlation with the amount of refrigerant charge among the one or more system parameters, quadratics of the three system parameters are used as independent variables in the regression analysis. In such embodiment, the three system parameters and quadratics of the three system parameters are used as independent variables in the regression analysis. The method includes determining the predictive model for estimating the amount of refrigerant charge based on the regression analysis using the independent variables. In one embodiment, the three system parameters include the suction superheat of the compressor, the mass flow of the HVACR system, and the mass flow or the degree of opening of the expansion device.

In one embodiment, the predictive model can be:

charge $\% = C0 + C1 \times SH + C2 \times MF + C3 \times SH^2 + C4 \times MF^2 + C5 \times EXV + C6 \times EXV^2$ In the above model, the charge can be the estimated amount of refrigerant charge (e.g., represented as a percentage). SH can be the suction superheat of the compressor. MF can be the mass flow of the HVACR system. EXV can be the mass flow or the degree of opening of the expansion device. C0 can be constant. C1, C2, C3, C4, C5, C6 can be empirical coefficients for each independent variables. The constant and the empirical coefficients can be determined based on the regression analysis.

In one embodiment, C0 can range from 1 to 2. C1 can range from −0.5 to −0.1. C2 can range from 1 to 2. C3 can range from 0.01 to 0.05. C4 can range from −1 to −0.1. C5 can range from −1.5 to −0.5. C6 can range from 0.1 to 0.5. In one embodiment, the results of the regression analysis are shown in the following table:

| Independent Variables | Coefficients | Standard error of the Coefficients |
|---|---|---|
| Constant | 1.5 | 0.047 |
| SH | −0.25 | 0.031 |
| MF | 1.5 | 0.087 |
| $SH^2$ | 0.03 | 0.0067 |
| $MF^2$ | −0.8 | 0.069 |
| EXV | −0.9 | 0.052 |
| $EXV^2$ | 0.45 | 0.02 |

In such embodiment, the predictive model can be:

Charge $\% = 1.5 - 0.25 \times SH + 1.5 \times MF + 0.03 \times SH^2 - 0.8 \times MF^2 - 0.9 \times EXV + 0.45 \times EXV^2$ Then the method proceeds to S104. At S104, the method includes estimating the amount of refrigerant charge for the HVACR system based on the predictive model.

Embodiments described herein use regression analysis on the one or more system parameters to determine predictive parameters for estimating the amount of refrigerant charge, and determine a predictive model for estimating the amount of refrigerant charge. Embodiments described herein can predict the amount of refrigerant charge directly (compared with predicting the refrigerant charge indirectly using the degree of superheat or sub-cooling), improve the precision of the prediction result, reduce the potential faults caused by insufficient refrigerant charge, improve user experience, and reduce maintenance cost for the user(s).

Figure 6:
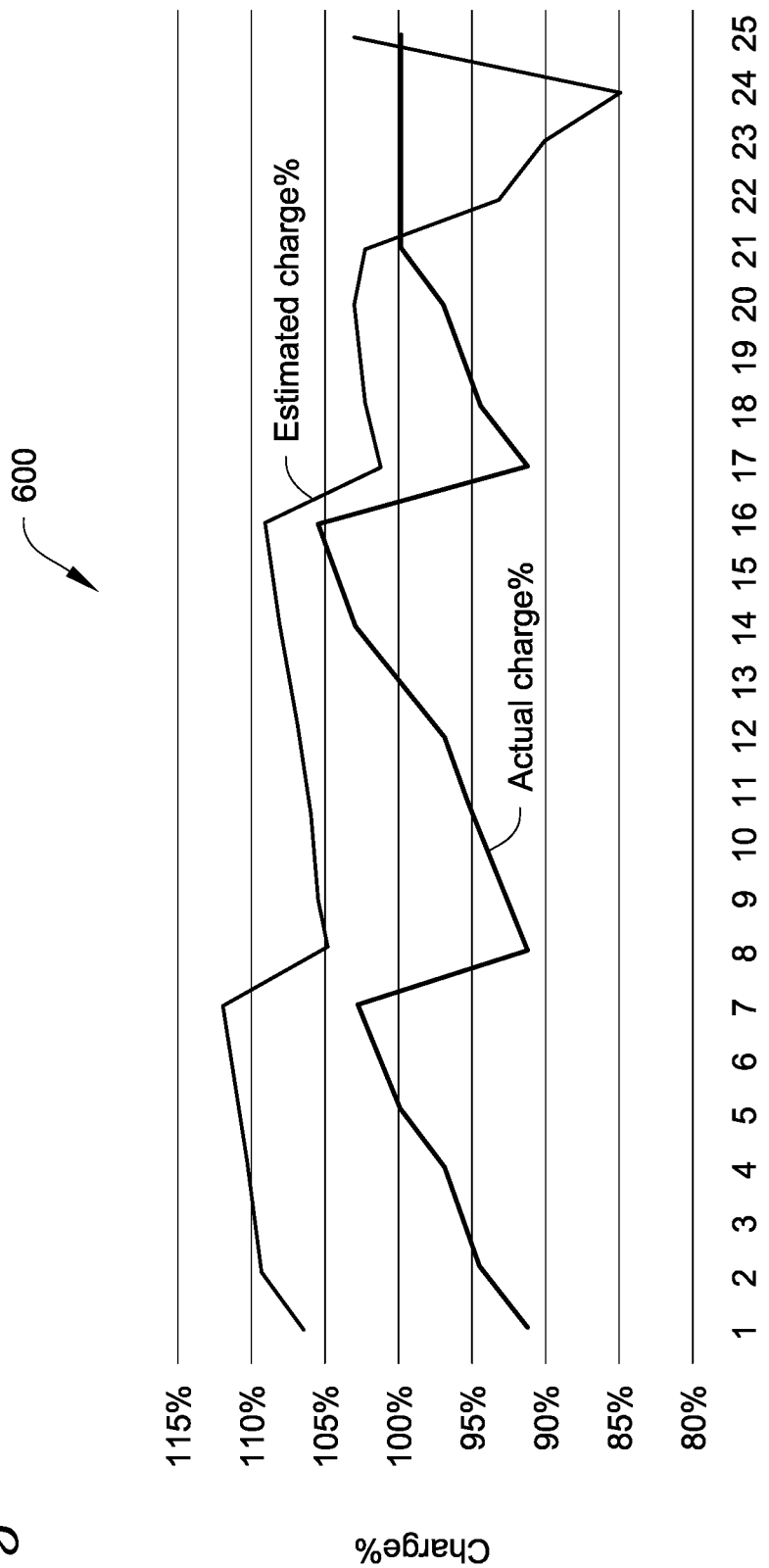
FIG. 6 is a schematic diagram illustrating a relationship between estimated values and actual values of the amount of refrigerant charge for an HVACR system, according to one embodiment.
Figure 7:
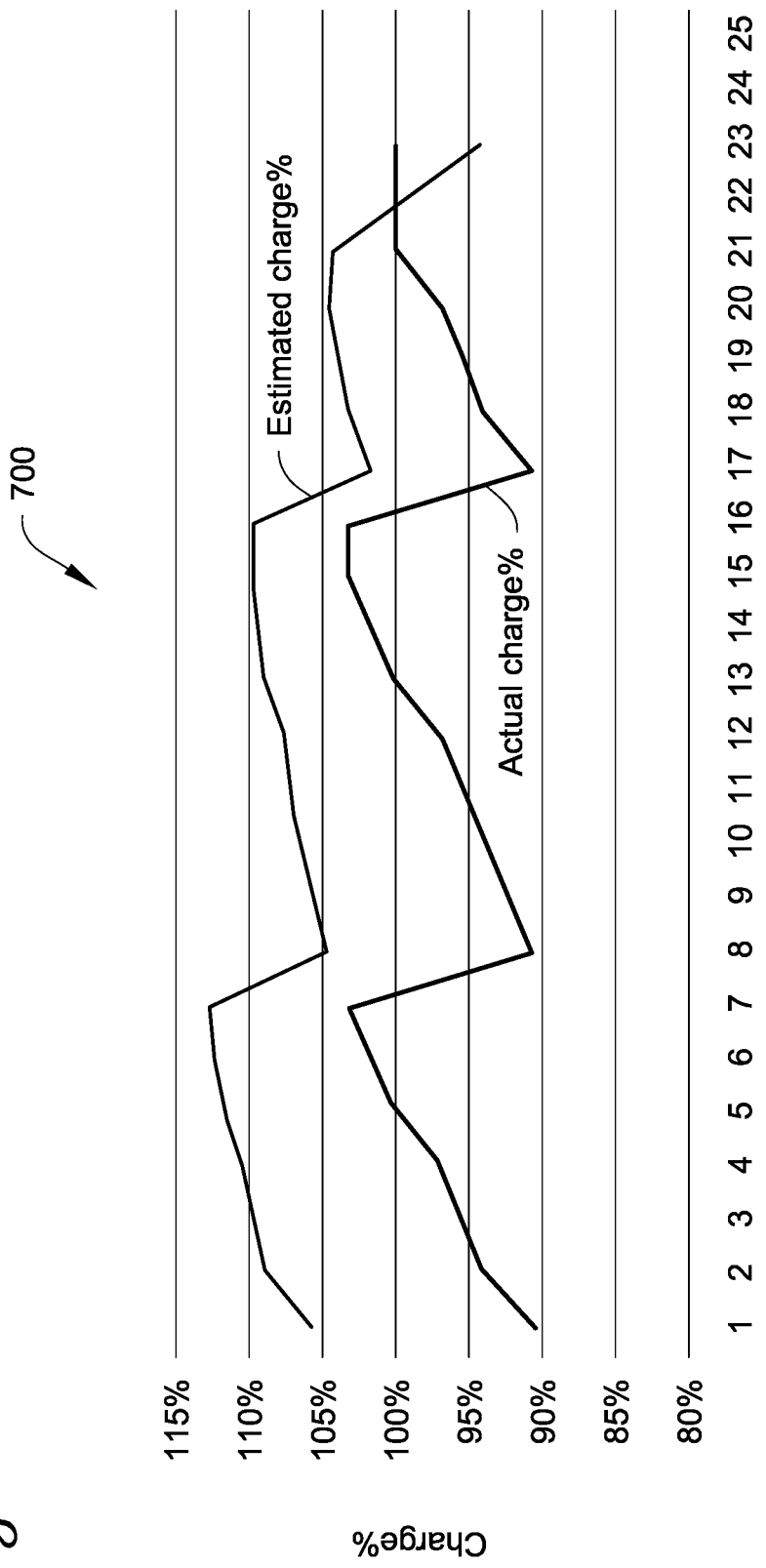
FIG. 7 is a schematic diagram illustrating a relationship between estimated values and actual values of the amount of refrigerant charge for another HVACR system, according to one embodiment.

In one embodiment, some steady-state data are selected from HVACR systems with capacity of e.g., 55 tons (See FIG. 6) and 75 tons (See FIG. 7), and after data processing, the established predictive model is used for estimating the amount of refrigerant charge for the HVACR system(s). The results show that in the embodiments disclosed herein, the error between the amount of refrigerant charge determined by the predictive model and the actual amount of refrigerant charge is not greater than 15%, and the trend of the two amounts is consistent with each other. FIG. 6 is a schematic diagram 600 illustrating a relationship between estimated values and actual values of the amount of refrigerant charge for an HVACR system, according to one embodiment. The horizontal coordinate represents different steady-state data points. FIG. 7 is a schematic diagram 700 illustrating a relationship between estimated values and actual values of the amount of refrigerant charge for another HVACR system, according to one embodiment. The horizontal coordinate represents different steady-state data points.

Referring back to FIG. 1, in one embodiment, the method includes after estimating the amount of refrigerant charge for the HVACR system based on the predictive model, when the estimated/predicted amount of refrigerant charge is less than or equal to a predetermined value, generating warning information to indicate a lack of refrigerant in the HVACR system, to prompt the user that there is insufficient refrigerant in the HVACR system. In one embodiment, the method can also include reporting the estimated amount of refrigerant charge (e.g., represented as a percentage). The processor that conducts the regression analysis is configured to generate the warning information and send the warning information to e.g., a display device (that connects to the processor) for displaying. The processor that conducts the regression analysis is also configured to report the estimated amount of refrigerant charge to e.g., a receiver (e.g., a display device) that connects to the processor.

Figure 8:
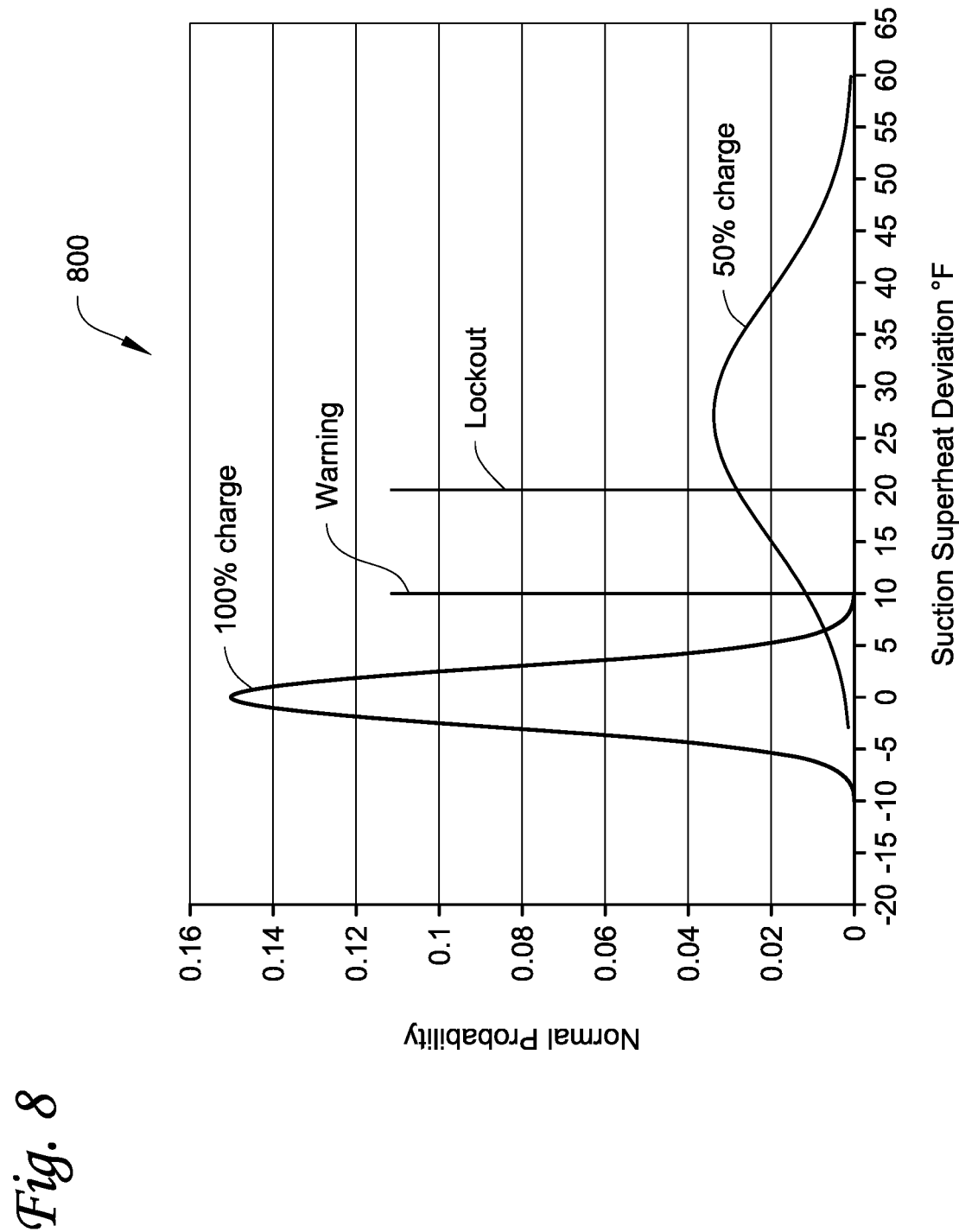
FIG. 8 is a schematic diagram illustrating success rate of estimating an amount of refrigerant charge for an HVACR system used for comparison purpose.

FIG. 8 is a schematic diagram 800 illustrating success rate of estimating an amount of refrigerant charge for an HVACR system used for comparison purpose.

In FIG. 8, the horizontal coordinate represents the degree of suction superheat deviation of a compressor to indicate whether the refrigerant is insufficient. The vertical coordinate represents the normal distribution probability. Warning indicates that warning information is generated, and Lockout indicates that the HVACR system can be locked out due to an alarm condition and, the alarm condition is cleared for the HVACR system to start again. As shown in FIG. 8, if the deviation of the SH (the degree of compressor suction superheat) is greater than 10° F., the HVACR system can generate warning information, and if the deviation of the SH is greater than 20° F., the HVACR system is locked out.

Figure 9:
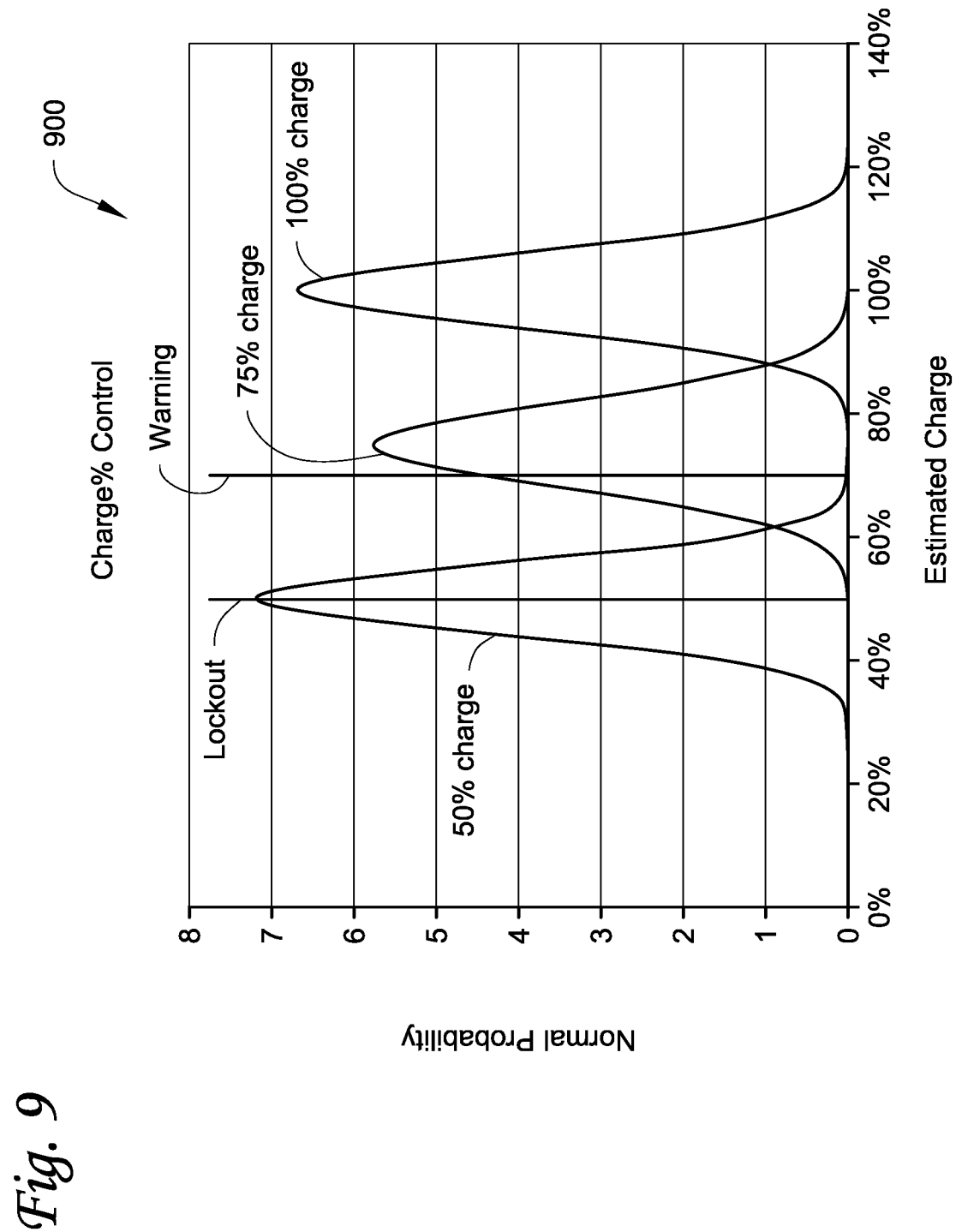
FIG. 9 is a schematic diagram illustrating success rate of estimating an amount of refrigerant charge for an HVACR system, according to one embodiment.

FIG. 9 is a schematic diagram 900 illustrating success rate of estimating an amount of refrigerant charge for an HVACR system, according to one embodiment.

As shown in FIG. 9, the horizontal coordinate represents the estimated amount of refrigerant charge according to the embodiments disclosed herein. The vertical coordinate represents the normal distribution probability. In FIG. 9, each curve has overall success rate of 20. The success rate of the amount of refrigerant charge being estimated for each curve can be represented by the vertical coordinate of each curve divided by 20. Compared with estimating the refrigerant charge indirectly using the degree of superheat (see e.g., FIG. 8) or sub-cooling for the HVACR system(s), embodiments described herein can improve the precision of the prediction result, especially when a large amount of the refrigerant charge is missing in the HVACR system(s).

In one embodiment, a "startup time" can be added, and for such time period after the HVACR system starts up, a Loss of Refrigerant Charge diagnostic (warning and/or lockout) is not triggered. In one embodiment, the predetermined threshold of refrigerant charge (e.g., represented as a percentage) for triggering a warning (which does not shut down the HVACR system) diagnostic, and the predetermined threshold of refrigerant charge (e.g., represented as a percentage) for triggering a lockout (which does shut down the HVACR system) diagnostic can be separated. In one embodiment, a predetermined time is waited when/after the refrigerant charge is below the predetermined threshold before triggering the warning/lockout diagnostic.

It will be appreciated that the above descriptions are only preferred embodiments, that the embodiments disclosed herein do not limit the disclosure, and that it is within the spirit and principle of the disclosure that any modification, equivalent substitution, improvement and the like, are all contained within the protection scope of the disclosure.

Aspects:

It is noted that any one of aspects 1-13 below can be combined with Aspect 14.

Aspect 1. A method for estimating an amount of refrigerant charge for a heating, ventilation, air conditioning, and refrigeration (HVACR) system, the HVACR system including a compressor and an expansion device, the method comprising:
operating the HVACR system;
obtaining one or more system parameters of the HVACR system during operation, the one or more system parameters including at least one of suction superheat of the compressor, suction saturated temperature of the compressor, mass flow of the HVACR system, mass flow or a degree of opening of the expansion device, and discharge saturated temperature of the compressor;
conducting a regression analysis on the one or more system parameters to determine one or more predictive parameters for estimating the amount of refrigerant charge;
based on the regression analysis, determining a predictive model for estimating the amount of refrigerant charge, the predictive model establishing a relationship between the amount of refrigerant charge and the one or more predictive parameters; and
estimating the amount of refrigerant charge for the HVACR system based on the predictive model.

Aspect 2. The method of aspect 1, wherein the step of conducting the regression analysis on the one or more system parameters to determine the one or more predictive parameters for estimating the amount of refrigerant charge includes:
conducting the regression analysis on the one or more system parameters to determine three system parameters as the one or more predictive parameters, the three system parameters having the largest correlation with the amount of refrigerant charge among the one or more system parameters, the one or more predictive parameters including the suction superheat of the compressor, the mass flow of the HVACR system, and the mass flow or the degree of opening of the expansion device.

Aspect 3. The method of aspect 2, wherein the step of determining the predictive model for estimating the amount of refrigerant charge includes:
applying the three system parameters and quadratics of the three system parameters as independent variables in the regression analysis, and
determining the predictive model for estimating the amount of refrigerant charge based on the regression analysis using the independent variables.

Aspect 4. The method of aspect 3, wherein the predictive model is:

$$\text{charge}=C0+C1\times SH+C2\times MF+C3\times SH^2+C4\times MF^2+C5\times EXV+C6\times EXV^2;$$

wherein charge is the estimated amount of refrigerant charge,
SH is the suction superheat of the compressor,
MF is the mass flow of the HVACR system,
EXV is the mass flow or the degree of opening of the expansion device,
C0 is a constant, and
C1, C2, C3, C4, C5, C6 are empirical coefficients.

Aspect 5. The method of aspect 4, wherein charge is represented as a percentage of refrigerant charge.

Aspect 6. The method of aspect 4 or aspect 5, wherein EXV is a normalized mass flow of the expansion device.

Aspect 7. The method of any one of aspects 2-6, wherein in the regression analysis, the suction superheat of the compressor, the mass flow of the HVACR system, and the degree of opening of the expansion device are relative values with respect to rated values.

Aspect 8. The method of any one of aspects 1-7, further comprising:
when the estimated amount of refrigerant charge is less than or equal to a predetermined threshold, generating warning information to indicate a lack of refrigerant in the HVACR system.

Aspect 9. The method of any one of aspects 1-8, further comprising:
reporting the estimated amount of refrigerant charge.

Aspect 10. The method of any one of aspects 1-9, further comprising:
before the step of obtaining one or more system parameters, operating a plurality of HVACR systems having different capacities under a plurality of operation conditions, with a plurality of predetermined amount of refrigerant charge and at a plurality of predetermined compressor speeds;
wherein the plurality of operation conditions defines a condenser load and an evaporator load;
wherein the step of obtaining one or more system parameters includes:
during operation of the plurality of HVACR systems having different capacities, obtaining one or more system parameters for each of the plurality of HVACR systems, the one or more system parameters including at least one of suction superheat of the compressor, suction saturated temperature of the compressor, mass flow of the HVACR system, mass flow or a degree of opening of the expansion device, and discharge saturated temperature of the compressor.

Aspect 11. The method of aspect 10, wherein the plurality of operation conditions includes at least one of the following conditions:
evaporator return air dry-bulb/wet-bulb temperature at or about 67° F./at or about 57° F., air volume at or about 200 CFM/ton, outdoor ambient temperature at or about 95° F.;
evaporator return air dry-bulb/wet-bulb temperature at or about 90° F./at or about 73° F., air volume at or about 350 CFM/ton, outdoor ambient temperature at or about 50° F.;
evaporator return air dry-bulb/wet-bulb temperature at or about 67° F./at or about 57° F., air volume at or about 200 CFM/ton, outdoor ambient temperature at or about 50° F.;
evaporator return air dry-bulb/wet-bulb temperature at or about 90° F./at or about 73° F., air volume at or about 350 CFM/ton, outdoor ambient temperature at or about 95° F.;
evaporator return air dry-bulb/wet-bulb temperature at or about 70° F./at or about 63° F., air volume at or about 200 CFM/ton, outdoor ambient temperature at or about 70° F.

Aspect 12. The method of aspect 10 or aspect 11, wherein refrigerant charge percentages corresponding to the plurality of predetermined amount of refrigerant charge include at or about 100%, at or about 75%, and at or about 50%.

Aspect 13. The method of aspect any one of aspects 10-12, before the step of operating the plurality of HVACR systems having different capacities under the plurality of operation conditions, the method further comprising at least one of the following steps:
controlling a first temperature for starting a frost-protection mechanism for each of the plurality of HVACR systems having different capacities to be less than a first predetermined temperature;
controlling a second temperature for starting a protection mechanism for suction saturated temperature of the compressor for each of the plurality of HVACR systems having different capacities to be greater than a second predetermined temperature;
turning off a warning mechanism indicating a lack of refrigerant for each of the plurality of HVACR systems having different capacities;
setting a condenser fan speed to an automatic control mode; and
setting a supply air temperature to at or about 40° F.

Aspect 14. A heating, ventilation, air conditioning, and refrigeration (HVACR) system, the HVACR system comprising:
a compressor, a condenser, an expansion device, and an evaporator fluidly connected;
one or more sensors; and
a controller,
wherein the controller is configured to obtain one or more system parameters of the HVACR system during operation, via the one or more sensors,
the one or more system parameters include at least one of suction superheat of the compressor, suction saturated temperature of the compressor, mass flow of the HVACR system, mass flow or a degree of opening of the expansion device, and discharge saturated temperature of the compressor,
the HVACR system is configured to conduct a regression analysis on the one or more system parameters to determine one or more predictive parameters for estimating the amount of refrigerant charge,
based on the regression analysis, the HVACR system is configured to determine a predictive model for estimating the amount of refrigerant charge, the predictive model establishing a relationship between the amount of refrigerant charge and the one or more predictive parameters, and
the HVACR system is configured to estimate the amount of refrigerant charge based on the predictive model.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A method for estimating an amount of refrigerant charge for a heating, ventilation, air conditioning, and refrigeration (HVACR) system, the HVACR system including a compressor and an expansion device, the method comprising:
operating the HVACR system;
obtaining system parameters of the HVACR system during operation, the system parameters including suction superheat of the compressor, mass flow of the HVACR system, and mass flow or a degree of opening of the expansion device;
conducting a regression analysis on the system parameters to determine predictive parameters for estimating the amount of refrigerant charge, the predictive parameters including the suction superheat of the compressor, the mass flow of the HVACR system, and the mass flow or the degree of opening of the expansion device;

based on the regression analysis, establishing a relationship, the relationship being between the amount of refrigerant charge and the predictive parameters; and estimating the amount of refrigerant charge for the HVACR system based on the established relationship.

2. The method of claim 1, wherein the step of establishing the relationship between the amount of refrigerant charge and the predictive parameters includes:

applying the predictive parameters and quadratics of the predictive parameters as independent parameters in the regression analysis, and determining the relationship for estimating the amount of refrigerant charge based on the regression analysis using the independent parameters.

3. The method of claim 1, wherein in the regression analysis, a value of the suction superheat of the compressor is the suction superheat of the compressor divided by a rated suction superheat of the compressor, a value of the mass flow of the HVACR system is the mass flow of the HVACR system divided by a rated mass flow of the HVACR system when the compressor is under a predetermined operation condition, and a value of the degree of opening of the expansion device is the degree of opening of the expansion device divided by a rated degree of opening of the expansion device.

4. The method of claim 1, further comprising:

when the estimated amount of refrigerant charge is less than or equal to a predetermined threshold, generating warning information to indicate a lack of refrigerant in the HVACR system.

5. The method of claim 1, further comprising:

reporting the estimated amount of refrigerant charge.

6. The method of claim 1, further comprising:

before the step of obtaining the system parameters, operating a plurality of HVACR systems including the HVACR system and having different capacities under a plurality of operation conditions, with a plurality of predetermined amount of refrigerant charge and at a plurality of predetermined compressor speeds;

wherein the plurality of operation conditions define a condenser load and an evaporator load;

wherein the step of obtaining the system parameters includes:

during operation of the plurality of HVACR systems having different capacities, obtaining the system parameters for each of the plurality of HVACR systems, the system parameters including suction superheat of the compressor, mass flow of the HVACR system, and mass flow or a degree of opening of the expansion device.

7. The method of claim 6, wherein the plurality of operation conditions includes following conditions:

evaporator return air dry-bulb/wet-bulb temperature at or about 67° F./ at or about 57° F., air volume at or about 200 CFM/ton, outdoor ambient temperature at or about 95° F.;

evaporator return air dry-bulb/wet-bulb temperature at or about 90° F./ at or about 73° F., air volume at or about 350 CFM/ton, outdoor ambient temperature at or about 50° F.;

evaporator return air dry-bulb/wet-bulb temperature at or about 67° F./ at or about 57° F., air volume at or about 200 CFM/ton, outdoor ambient temperature at or about 50° F.;

evaporator return air dry-bulb/wet-bulb temperature at or about 90° F./ at or about 73° F., air volume at or about 350 CFM/ton, outdoor ambient temperature at or about 95° F.;

evaporator return air dry-bulb/wet-bulb temperature at or about 70° F./ at or about 63° F., air volume at or about 200 CFM/ton, outdoor ambient temperature at or about 70° F.

8. The method of claim 6, wherein refrigerant charge percentages corresponding to the plurality of predetermined amount of refrigerant charge include at or about 100%, at or about 75%, and at or about 50%.

9. The method of claim 6, before the step of operating the plurality of HVACR systems having different capacities under the plurality of operation conditions, the method further comprising following steps:

controlling a first temperature for each of the plurality of HVACR systems having different capacities to be less than a first predetermined temperature;

controlling a second temperature for suction saturated temperature of the compressor for each of the plurality of HVACR systems having different capacities to be greater than a second predetermined temperature;

turning off a warning mechanism indicating a lack of refrigerant for each of the plurality of HVACR systems having different capacities;

setting a condenser fan speed to an automatic control mode; and setting a supply air temperature to at or about 40° F.

10. A heating, ventilation, air conditioning, and refrigeration (HVACR) system, the HVACR system comprising:

a compressor, a condenser, an expansion device, and an evaporator fluidly connected;

at least one sensor; and a controller, wherein the controller is configured to obtain system parameters of the HVACR system during operation, via the at least one sensor, the system parameters include suction superheat of the compressor, mass flow of the HVACR system, and mass flow or a degree of opening of the expansion device, the HVACR system is configured to conduct a regression analysis on the system parameters to determine predictive parameters for estimating an amount of refrigerant charge, the predictive parameters including the suction superheat of the compressor, the mass flow of the HVACR system, and the mass flow or the degree of opening of the expansion device, based on the regression analysis, the HVACR system is configured to establish a relationship, the relationship being between the amount of refrigerant charge and the predictive parameters, and the HVACR system is configured to estimate the amount of refrigerant charge based on established relationship.

11. The system of claim 10, wherein the HVACR system is further configured to:

apply the predictive parameters and quadratics of the predictive parameters as independent parameters in the regression analysis, and determine the relationship for estimating the amount of refrigerant charge based on the regression analysis using the independent parameters.

12. The system of claim 10, wherein in the regression analysis, a value of the suction superheat of the compressor is the suction superheat of the compressor divided by a rated suction superheat of the compressor, a value of the mass flow of the HVACR system is the mass flow of the HVACR system divided by a rated mass flow of the HVACR system when the compressor is under a predetermined operation condition, and a value of the degree of opening of the expansion device is the degree of opening of the expansion device divided by a rated degree of opening of the expansion device.

13. The system of claim 10, wherein the HVACR system is further configured to:
    when the estimated amount of refrigerant charge is less than or equal to a predetermined threshold, generate warning information to indicate a lack of refrigerant in the HVACR system.

14. The system of claim 10, wherein the HVACR system is further configured to:
    report the estimated amount of refrigerant charge.

\* \* \* \* \*